US011632143B1

(12) United States Patent
Thommana et al.

(10) Patent No.: US 11,632,143 B1
(45) Date of Patent: Apr. 18, 2023

(54) MULTIPLE CHANNEL BEYOND LINE OF SIGHT WAVEFORM SOFTWARE-DEFINED RADIO

(71) Applicant: Rockwell Collins, Inc., Cedar Rapids, IA (US)

(72) Inventors: John V. Thommana, Cedar Rapids, IA (US); Jeffrey Grundmeyer, Walker, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 173 days.

(21) Appl. No.: 17/024,908

(22) Filed: Sep. 18, 2020

(51) Int. Cl.
*H04B 7/216* (2006.01)
*H04B 1/707* (2011.01)
*H04B 1/00* (2006.01)

(52) U.S. Cl.
CPC ........... *H04B 1/707* (2013.01); *H04B 1/0003* (2013.01); *H04B 7/216* (2013.01)

(58) Field of Classification Search
CPC ...... H04B 1/707; H04B 1/0003; H04B 7/216; H04B 2201/70701; H04B 7/2628; H04J 13/00; H04J 13/16; H04L 41/16; H04L 41/14; H04L 41/142; H04L 41/145; H04L 41/147; H04L 41/149; H04L 45/08; H04L 45/85; H04L 45/851; H04L 67/12; H04W 4/70; H04W 28/0215; H04W 72/048; H04W 16/18; H04W 16/20; H04W 16/22; H04W 16/225; G06N 3/02; G06N 3/08; G06N 3/10; G06N 20/00; G06N 20/20
See application file for complete search history.

(56) References Cited

U.S. PATENT DOCUMENTS

| 4,914,699 A | 4/1990 | Dunn et al. |
| 6,020,845 A | 2/2000 | Weinberg et al. |
| 6,163,524 A * | 12/2000 | Magnusson ............. H04J 13/20 370/208 |
| 6,181,734 B1 * | 1/2001 | Palermo ............... H04B 1/0003 375/220 |

(Continued)

FOREIGN PATENT DOCUMENTS

EP 0363640 B1 1/1997

OTHER PUBLICATIONS https://www.cobra-design-eng.com/products/, "Diplexer/Triplexer", Cobra Design & Engineering Inc., Printed Jul. 15, 2020.

(Continued)

*Primary Examiner* — Phuongchau Ba Nguyen
(74) *Attorney, Agent, or Firm* — Suiter Swantz pc llo

(57) ABSTRACT

A system may include a software-defined radio (SDR) configured to communicate over multiple channels by using a beyond line of sight (BLOS) waveform. The SDR may be configured to transmit encrypted communications over some or all of the multiple channels to a satellite and on to at least one radio access node (RAN). The SDR may be configured to receive encrypted communications over some or all of the multiple channels from the at least one RAN via the satellite. At least one of the multiple channels may use a spreading factor greater than 256. The SDR may be configured to simultaneously transmit and receive encrypted communications over the multiple channels.

13 Claims, 7 Drawing Sheets

(56) References Cited

U.S. PATENT DOCUMENTS

| | | | |
|---|---|---|---|
| 6,791,960 B1* | 9/2004 | Song | H04B 1/7075 |
| | | | 370/335 |
| 7,187,708 B1* | 3/2007 | Shiu | H04B 1/707 |
| | | | 375/135 |
| 7,804,887 B2 | 9/2010 | Page | |
| 7,831,255 B1* | 11/2010 | Gribble | H04B 17/0085 |
| | | | 455/67.11 |
| 7,903,749 B2 | 3/2011 | Moffatt | |
| 7,962,089 B1* | 6/2011 | Thommana | H04L 63/302 |
| | | | 370/395.2 |
| 3,055,209 A1 | 11/2011 | Dao | |
| 8,374,272 B2 | 2/2013 | Hammons et al. | |
| 9,094,842 B2 | 7/2015 | Geile | |
| 9,373,251 B2* | 6/2016 | Feher | H04B 7/0413 |
| 10,587,291 B2 | 3/2020 | Pehlke et al. | |
| 10,841,145 B1* | 11/2020 | Geist | H04L 9/0618 |
| 11,050,443 B1* | 6/2021 | Thommana | H04B 1/0057 |
| 2005/0198686 A1* | 9/2005 | Krause | H04L 63/0428 |
| | | | 725/31 |
| 2007/0192586 A1* | 8/2007 | McNeely | H04N 21/4263 |
| | | | 713/153 |
| 2011/0131468 A1* | 6/2011 | Myers | H04L 27/233 |
| | | | 714/752 |
| 2012/0081259 A1 | 4/2012 | Regala | |
| 2018/0367170 A1 | 12/2018 | McIntyre et al. | |
| 2019/0058495 A1 | 2/2019 | Myers | |

OTHER PUBLICATIONS https://www.collinsaerospace.com/what-we-do/military-and-defense/communications/airborne-communications/vhf-uhf-band/arc-210-rt-2036-c, "ARC-210 RT-2036 (C) Networked Communications Airborne Radio", Collins Aerospace, Printed Jul. 15, 2020.

* cited by examiner

MULTIPLE CHANNEL BEYOND LINE OF SIGHT WAVEFORM SOFTWARE-DEFINED RADIO

BACKGROUND

In contested theaters, the jamming and detection of signals with inadequate robustness and covertness on tactical satellite communication (SATCOM) waveforms are threats.

SUMMARY

In one aspect, embodiments of the inventive concepts disclosed herein are directed to a system. The system may include a software-defined radio (SDR) configured to communicate over multiple channels by using a beyond line of sight (BLOS) waveform. The SDR may be configured to transmit encrypted communications over some or all of the multiple channels to a satellite and on to at least one radio access node (RAN). The SDR may be configured to receive encrypted communications over some or all of the multiple channels from the at least one RAN via the satellite. At least one of the multiple channels may use a spreading factor greater than 256. The SDR may be configured to simultaneously transmit and receive encrypted communications over the multiple channels.

In a further aspect, embodiments of the inventive concepts disclosed herein are directed to a method. The method may include: communicating, by a software-defined radio (SDR), over multiple channels by using a beyond line of sight (BLOS) waveform; transmitting, by the SDR, encrypted communications over some or all of the multiple channels to a satellite and on to at least one radio access node (RAN); and receiving, by the SDR, encrypted communications over some or all of the multiple channels from the at least one RAN via the satellite, wherein at least one of the multiple channels uses a spreading factor greater than 256, wherein the SDR is configured to simultaneously transmit and receive encrypted communications over the multiple channels.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
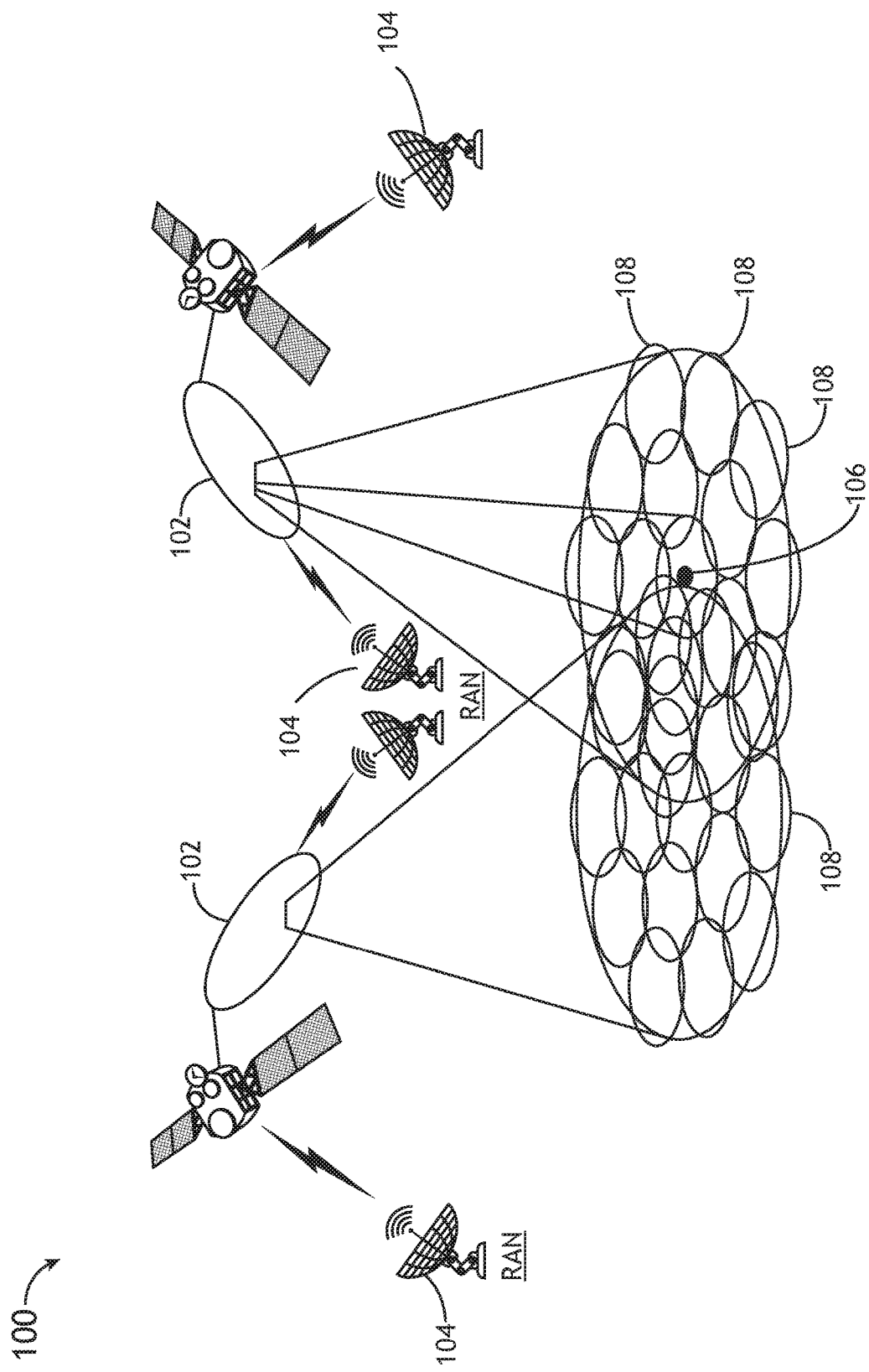
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including a software-defined radio (SDR) configured to communicate over at least one channel by using a BLOS waveform and/or a LOS waveform.

Some embodiments may provide a more robust BLOS waveform that can be supported on an SDR.

As used throughout, robust may mean resistant to enemy jamming and interference.

As used throughout, spreading factor may mean the amount of redundancy introduced into the data rate to add robustness. For example, in Universal Mobile Telecommunications Service (UMTS) (3G Cellular) at the 9600 bits per second (bps) data rate, each data bit is multiplied by a 64-chip spreading factor code to make transmitted data more resistant to interference and jamming.

As used throughout, processing gain may be a metric to measure the robustness. For example, for a 64-chip spreading factor code, processing gain may be equal to $10*\log_{10}$ (Spreading Factor)=$10*\log_{10}(64)$=18.06 decibel (dB).

Currently, on a single 5 megahertz (MHz) channel, there may be multiple users transmitting and receiving data with different spreading factors up to 256. Some embodiments may increase the spreading factor above 256, for example as high as (but not limited to) 2048 (e.g., using orthogonal variable spreading factor (OVSF)) or 2560 (e.g., without using OVSF) or potentially higher. In some embodiments, not using OVSF may have security advantages. For example, each 5 MHz channel and the users on it may be controlled by a base station. Multiple channels may refer to multiple base stations collaborating to either increase the data rate and/or robustness. Each of the base stations (e.g., 2, 3, 4, 5, 6, 7, or 8) may use a different frequency (e.g., a frequency channel). Currently, radios only access a single 5 MHz channel. Some embodiments are configured to transmit and receive on multiple 5 MHz channels, which can further increase the robustness and/or data rate capabilities.

In some embodiments, there can be one or more users using spreading factors greater than 256 on each 5 MHz channel available. The use of multiple 5 MHz channels can be further used to increase the data rate and/or robustness of each user's transmission.

Figure 2:
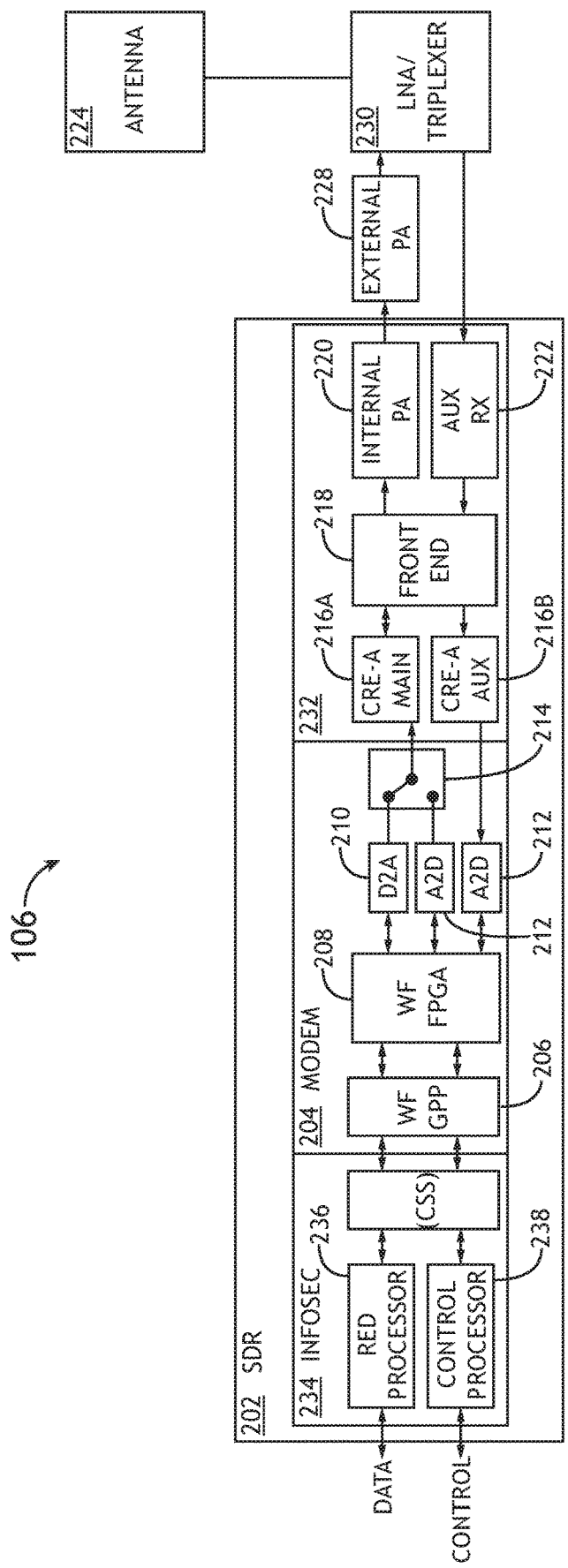
FIG. 2 is a view of an exemplary node of the system of FIG. 1 of an exemplary embodiment according to the inventive concepts disclosed herein.
Figure 3:
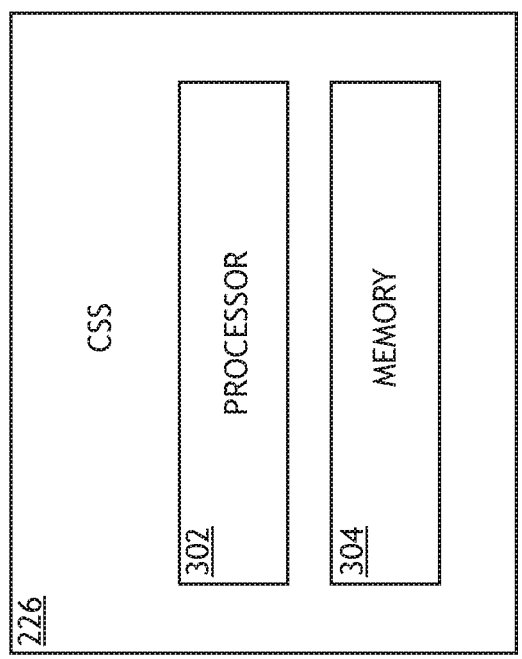
FIG. 3 is a view of an exemplary cryptographic subsystem (CSS) of the node of FIG. 2 of an exemplary embodiment according to the inventive concepts disclosed herein.

Referring now to FIGS. 1-3, an exemplary embodiment of a system 100 according to the inventive concepts disclosed herein is depicted. The system 100 may be implemented as any suitable system, such as a network. The system 100 may include at least one satellite 102, at least one radio access node (RAN) 104 (sometimes referred to as a base station), and/or at least one node 106, some or all of which may be communicatively coupled at any given time. For example, the satellite's 102 antennas may form a plurality of beams configured to transmit signals to the RANs 104 and the nodes 106. For example, each of the RANs 104 and the nodes 106 may transmit communications to and receive communications from the satellites 102.

As shown in FIG. 2, for example, the node 106 may be any suitable network node, such as a terminal (e.g., a vehicle (e.g., an aircraft, a watercraft, a submersible craft, an automobile, a spacecraft, a satellite, and/or a train) or a manpack). For example, as shown in FIG. 2, the node 106 may include at least one SDR 202, at least one external power amplifier 228, at least one low noise amplifier (LNA) and triplexer assembly 230 (e.g., including an LNA and a triplexer), and/or at least one antenna 224, some or all of which may be communicatively coupled at any given time.

As shown in FIG. 2, the SDR 202 may include at least one modem 204, at least one transceiver and receiver assembly 232, and/or at least one information security (INFOSEC) system 234, some or all of which may be communicatively coupled at any given time. In some embodiments, the SDR 202 may be an ARC-210 SDR.

In some embodiments, the SDR 202 may be configured to communicate over multiple channels by using a BLOS waveform. The SDR 202 may be configured to transmit encrypted communications over some or all of the multiple channels to a satellite 102 and on to a RAN 104. The SDR 202 may be configured to receive encrypted communications over some or all of the multiple channels from the RAN 104 via the satellite 102. At least one of the multiple channels may use a spreading factor greater than 256. The SDR 202 may be configured to simultaneously transmit and receive encrypted communications over the multiple channels. In some embodiments, the SDR 202 may support multiple users in a 5 megahertz (MHz) channel, wherein the multiple users are allocated spreading codes with spreading factors greater than 256 to communicate with a single RAN 104. In some embodiments, the SDR 202 supports a user allocated multiple 5 megahertz (MHz) channels to communicate with multiple RANs 104 using spreading factors greater than 256.

The modem 204 may include at least one processor (e.g., at least one general purpose processor (e.g., at least one waveform general purpose processor 206) and/or at least one field-programmable gate array (FPGA) (e.g., at least one waveform FPGA 208)), memory, at least one digital-to-analog converter (D2A) 210, at least one (e.g., two) analog-to-digital converter (A2D) 212, and/or at least one switch 214, some or all of which may be communicatively coupled at any given time.

The at least one processor of the modem 204 may be implemented as any suitable type and number of processors. For example, the at least one processor may include at least one general purpose processor (e.g., at least one central processing unit (CPU)), at least one digital signal processor (DSP), at least one application specific integrated circuit (ASIC), and/or at least one field-programmable gate array (FPGA). The at least one processor may be configured to perform (e.g., collectively perform if more than one processor) any or all of the operations disclosed throughout. The at least one processor may be configured to run various software applications or computer code stored (e.g., maintained) in a non-transitory computer-readable medium (e.g., memory) and configured to execute various instructions or operations. For example, the at least one processor may be configured to process, in parallel, the received encrypted communications and to-be-transmitted encrypted communications that become the transmitted encrypted communications.

The transceiver and receiver assembly 232 may include at least one (e.g., two) common receiver-exciter (CRE) 216A, 216B, at least one front end 218, at least one power amplifier (e.g., at least one internal power amplifier 220), and/or at least one receiver (e.g., at least one auxiliary receiver 222), some or all of which may be communicatively coupled. CREs are sometimes referred to as transmitters, receivers, and/or transceivers.

The INFOSEC system 234 may include at least one processor (e.g., at least one red processor 236 and/or at least one control processor 238) and/or at least one cryptographic subsystem (CSS) 226, some or all of which may be communicatively coupled. For example, the red processor 236 may interface with a host platform of the node 106 for exchanging data traffic. For example, the control processor 238 may be used to configure the SDR 202 radio configuration and mode setting.

The CSS 226 may be used for transmission security (TRANSEC), communications security (COMSEC), and/or authentication. The CSS 226 may be configured to use particular spreading factors for the transmitted encrypted communications. As shown in FIG. 3, the CSS 226 may include at least one processor 302 and memory 304, some or all of which may be communicatively coupled at any given time. The at least one processor 302 may be implemented as any suitable type and number of processors. For example, the at least one processor 302 may include at least one general purpose processor (e.g., at least one central processing unit (CPU)), at least one digital signal processor (DSP), at least one application specific integrated circuit (ASIC), and/or at least one field-programmable gate array (FPGA). The at least one processor 302 may be configured to perform (e.g., collectively perform if more than one processor) any or all of the operations disclosed throughout. The at least one processor may 302 be configured to run various software applications (e.g., cryptographic equipment application(s) (CEA(s))) or computer code stored (e.g., maintained) in a non-transitory computer-readable medium (e.g., memory 304) and configured to execute various instructions or operations. All information exchanged over the system may be encrypted. For example, the modem 204 may be connected to the CSS 226 that encrypts and decrypts the traffic stream. The waveform general purpose processor 206 may pick up the encrypted traffic from the CSS 226 and forwards the encrypted traffic over an appropriate radiofrequency (RF) channel after being covered by the robust spreading factor and similarly on the receive side, the processor 206 may get the despread encrypted traffic from the FPGA 208 and forward the traffic to the CSS 226 for decryption.

The at least one antenna 224 may be configured to transmit and/or receive communications.

In some embodiments, the BLOS waveform may be a slotted code-division multiple access (CDMA) direct sequence spread spectrum waveform, which may have a 10-millisecond frame and each frame may have 15 slots. The BLOS waveform may be a military waveform. Each slot can carry 2560 waveform chips, and the number of bits transported in the slot is dependent on the spreading factor used. Current data waveforms are limited to a spreading factor of no larger than 256. Some embodiments allow for spreading factors greater than 256 to be used, such as spreading factors of 2048 or 2560.

In some embodiments, at least some of the multiple channels may be aggregated to transmit a wider-band signal than one of the multiple channels. For example, the wider-band signal may spread data over the at least some of the multiple channels to at least one of increase robustness or improve a low probability of detection (LPD). In some embodiments, the multiple channels may be any suitable number of channels. For example, the multiple channels may include eight channels, and the SDR 202 may be configured to simultaneously transmit and receive the encrypted communications in parallel over the eight channels. In some embodiments, the SDR 202 may be configured to, at a given time, enable one of: an increased data rate by transmitting different data on each of the multiple channels, an increased robustness by transmitting same data on each of the multiple channels, or a hybrid increased robustness and increased data rate by transmitting same data on at least two of the multiple channels and transmitting different data on at least two other of the multiple channels. In some embodiments, the SDR 202 may be configured to, at a given time, enable one of: an increased robustness, a lower probability of detection (LPD), or a hybrid increased robustness and LPD, wherein the hybrid increased robustness and LPD has a lower robustness than the increased robustness and a higher probability of detection than the LPD.

In some embodiments, all of the multiple channels may use a spreading factor greater than 256. In some embodiments, the at least one of the multiple channels may use a spreading factor between 512 and 2,560, inclusive. For example, there can be multiple users in each channel using spreading factors greater than 256. Some users, who require higher robustness and/or data rate, can simultaneously communicate with multiple base stations using multiple 5 MHz channels.

The multiple channels may include control channels and data channels. The SDR 202 may follow a synchronization and registration process if these services are available and not denied by an enemy. If these services are denied by the enemy, then the SDR 202 may look for pre-configured secure control channels that will perform similar services. In some embodiments, these services may use a spreading factor that is greater than the 256, such as a spreading factor of 512, . . . , 2048, . . . , or 2560. The keys needed to generate the spreading factor codes in use for a day to access the control channels may be stored in the node's 106 CSS 226, and the configuration may identify the key identification (ID) to be used for accessing a robust BLOS system. A limited number of users can use this mechanism and register into the network where the users will be allocated spreading codes that can be used to decode transmissions from the RAN 104 and spreading codes to use when transmitting to the RAN 104.

For example, the multiple channels may include eight 5 megahertz (MHz) full-duplex channels that can be used to provide voice and data services to terminals. For example, some embodiments may include communications using any integer number (e.g., between 1 through 8) of the eight channels, each of which may be 5 MHz wide. Some embodiments may be configured to access all eight channels (40 MHz bandwidth) or 6 channels (30 MHz bandwidth) transmit and receive frequencies simultaneously. The A2D 212 in the modem may digitize all eight receive channels and feed the digitized channels to the waveform FPGA 208 for receive processing. The waveform FPGA 208 may implement a filtering scheme to deliver eight parallel processing streams related to the eight receive channels, and the FPGA 208 may process all 8 channels in parallel while performing identical processing on each of the individual channels. A similar process may be followed on the transmit side with the FPGA 208 being able to transmit up to 8 parallel transmit streams in parallel.

The WF GPP 206 may be configured to look at each channel for the robust control channel being transmitted by the RAN 104. The SDR 202 may be capable of processing multiple spreading factor codes simultaneously so that, for example, the SDR 202 can access up to 16 control channels in any of the eight receive channels as the RAN 104 can transmit multiple control channels on each 5 MHz channel. The information needed to access the network may be accessible by the terminal after decoding the robust control channel. Once the terminal determines the active receive channel(s) (can be one or multiple), the terminal can determine the control channel codes needed to talk to the RAN 104 on one or more channels simultaneously. The terminal may then register with the RAN 104 as a normal user or as a robust user. On registering with the RAN 104 as a robust user, the terminal may receive one or more transmit/receive code pairs to exchange data information with the network on one or more channels. The WF FPGA 208 may be given the transmit and receive spreading factor codes along with the channel information. All data from and to the channel may now be covered by the appropriate spreading factor code and base station code. As the spreading factor increases, the amount of transmit power in every Hertz (Hz) of the 5 MHz channel reduces. For example, if we were using a spreading factor of 64 and this put 0.1 Watts (W) of power in each Hz of bandwidth, then going to 128 reduces the power in each Hz of bandwidth to 0.05 watts and so forth. The end result is that the power spectral density—distribution of power—in the bandwidth reduces.

A user may be allocated a spreading code depending on the robustness and/or data rate needed. A channel of the multiple channels that uses a higher spreading factor may get more robustness against interference and jamming. For example, using a spreading factor of 64 having a processing gain of 18.06 dB may allow for a data rate of 9,600 bps. For example, using a spreading factor of 256 having a processing gain of 24.08 dB may allow for a data rate of 2,400 bps. For example, using a spreading factor of 512 having a processing gain of 27.09 dB may allow for a data rate of 1,200 bps.

For example, the SDR 202 may have the capability to transmit and receive up to 8 channels simultaneously. Therefore, the SDR 202 can exchange 8×1200 bps at a specified processing gain (increasing data rate to a terminal without change in robustness). Similarly, if the robustness is increased by a factor of 8 (9 dB) by sending the same information on all eight channels, this would be equivalent to exchanging 1200 bps with higher robustness.

Increasing processing gain may have one or more benefits, such as any of the following: increased robustness to allow for operating in higher interference or jamming environments; lower probability of detection (LPD) that can reduce the transmit power by an equivalent factor so that transmissions cannot be detected by an enemy, but with some loss of the additional susceptibility to interference and jamming; or a benefit combining increased robustness and LPD, wherein the increased benefits can be distributed partly to robustness and partly to power reduction getting better overall performance but not the maximum possible for robustness or LPD.

The BLOS waveform may be a 5 MHz BLOS full-duplex SATCOM waveform. For example, two 40 MHz portions of spectrum may be allocated, with one portion for transmit and the other for receive, and the two portions may be separated by a 20 MHz guard band. In some embodiments, the SDR 202 can support 8 simultaneous full-duplex communication channels.

Experiments have shown that the SDR 202 can reliably close a 9.6 kilobits per second (kbps) link with less than 100 milliwatt EIRP (20 dBm)—the stable EIRP the terminal settles to after the closed loop power control settles. For example, an airborne terminal can transmit in one of the 8 channels. If it is assumed that the antenna side lobes are 20 dB down, when operating with a typical aircraft SATCOM antenna using the zenith element, then this transmission can be heard by an interceptor who is within a 5 kilometer (km) radius of the aircraft.

For example, using a spreading factor of 2,048 would increase the processing gain by 15 dB, such that the base station can reduce the transmit power by 15 dB without sacrificing the bit error rate (BER) performance or anti-jam performance. This can be considered as a covert mode as the transmission will be below the interceptor's sensitivity 2 kilometers away. This is equivalent to saying that the transmission from an aircraft flying at 7,000 feet cannot be detected on the ground.

A slight change to the power control algorithm can allow for a tradeoff between anti-jam and covertness. For example, we can trade capacity and transmit at 100 milliwatt EIRP and use the additional 15 dB to counter jamming.

In some embodiments, the SDR 202 may be configured for a single-carrier multichannel BLOS waveform. The SDR 202 may be configured to aggregate multiple 5 MHz channels to send a wider-band signal.

For example, the multichannel implementation can be used to improve anti-jam performance. Here the CRE assembly 216 may be configured so as to transmit over 6-channels and receive 6-channels simultaneously or transmit and receive over all 8 channels without aliasing. In some embodiments, the SDR 202 may be able to process 8 channels using sub-Nyquist sampling.

For example, using a chipping rate of 30.72 mega chips per second (Mcps) (8×3.84 Mcps) to deliver 9.6 kbps over 8 channels may provide a 9 dB improvement in processing gain. Additional improvement in anti-jam performance can be obtained by lowering the data rate. In some embodiments, the satellite 102 may also be capable of similar channel aggregation.

Figure 4:
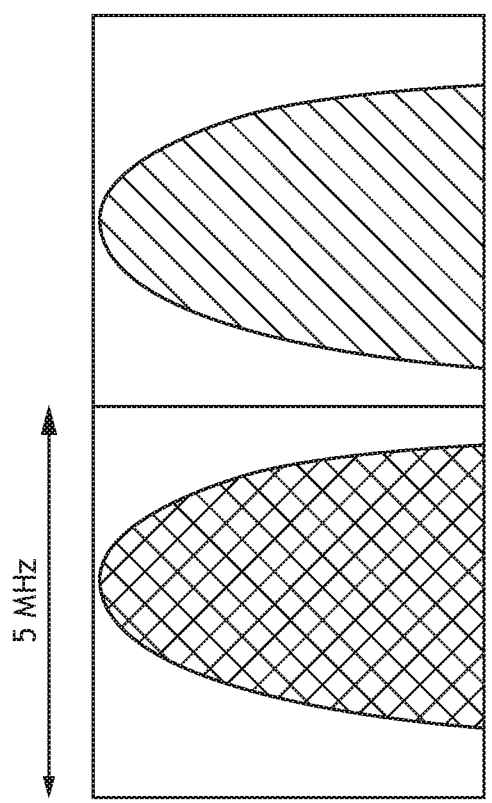
FIGS. 4, 5, and 6 show exemplary diagrams related to exemplary embodiments of the SDR of FIG. 2 configured for a multiple-carrier BLOS waveform according to the inventive concepts disclosed herein.
Figure 5:
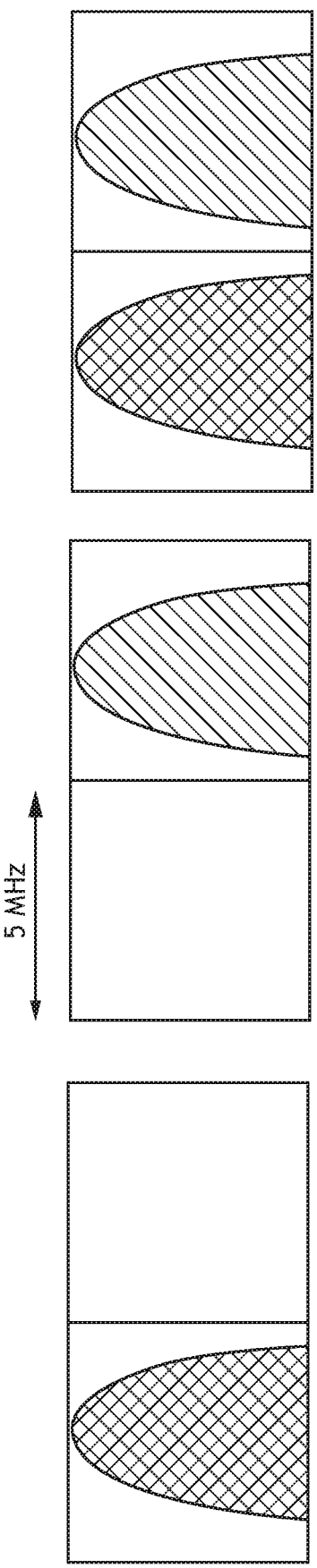
Figure 6:
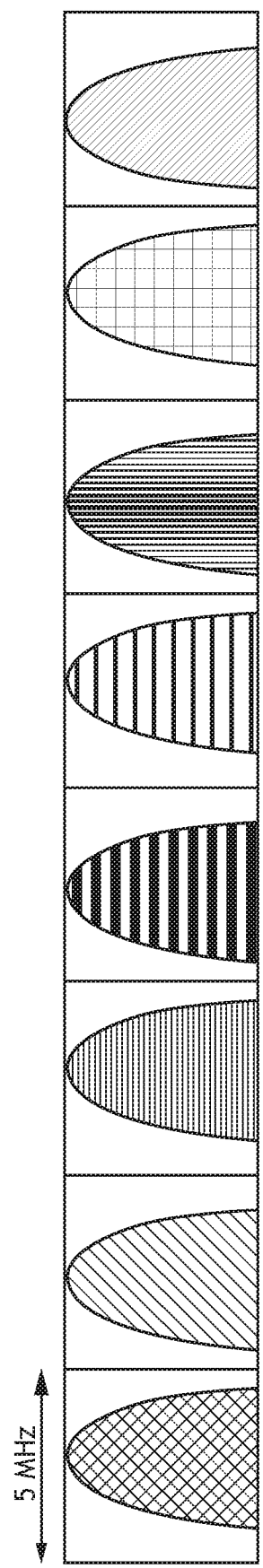

Referring now to FIGS. 4-6, exemplary diagrams related to exemplary embodiments of the SDR 202 configured for a multiple-carrier BLOS waveform according to the inventive concepts disclosed herein are depicted. Each satellite 102 may have multiple (e.g., 16) spot beams 108 with each beam 108 having zero or more (e.g., 0 to 4) carriers, illustrated in FIG. 1. Each carrier is equivalent to a base station servicing a set of BLOS customers. Thus, a fully loaded satellite 102 may be equivalent to having 64 base stations servicing a large geographical area.

For example, for a spot beam 108 with two carriers (analogous to two base stations), the two channels may be adjacent channels. At the satellite 102 end, the satellite 102 may operate multiple up and down links concurrently with acceptable co-channel interference. FIG. 4 illustrates a 2-channel multi-carrier transmission scheme. A highly linear power amplifier 220 connected to the SDR 202 can support a multi-carrier transmission efficiently as there may be more than 30 dB power head room to account for peak to average power ratio (PAPR) variations. For example, SDR at the terminal connect to both carriers of the satellite 102 simultaneously as two independent connections. If the two carriers do not collaborate, then the transmissions from the terminal to carrier and carrier to the terminal may not be coordinated, which may look like Ping-Pong frequency hopping operations and sometimes the transmissions line up, such as illustrated in FIG. 5.

Each transmission may have the same anti-jam performance as that of robust and/or LPD BLOS. The SDR 202 may concurrently process two independent simultaneous connections. This can double the data throughput that can be sustained without any additional robustness or covertness benefit.

As shown in FIG. 6, extending this to all eight carriers may be achieved. This may allow the SDR 202 to increase the data throughput by 8× as illustrated in FIG. 6. To support this operation, the satellite 102 may have to point two beams with each beam having four carriers so that the aircraft can see all eight carriers simultaneously. This may be equivalent to the airborne terminal talking to 8 base stations simultaneously and delivering an 8× data throughput increase with no increase in anti-jam or covertness.

As the number of channels supported increases, the processing complexity may also increase as the waveform FPGA 208 has to support a large combination of transmission bursts at every transmission. The receive functionality may be much easier as it is equivalent to parallelization. If the base stations coordinate with each other such that the base stations allocate transmission and reception opportunities simultaneously then there may always be operability for a N-channel transmit or N-channel receive operation, which may reduce the implementation complexity considerably and also support the robust and covert multi-carrier modes more easily.

In some embodiments, the SDR 202 may be configured for robust and LPD multiple-carrier BLOS waveform. In order to increase the anti-jam performance, the data can be spread over multiple carriers. To support a 4800 bps connection over a robust and LPD BLOS, there can be a gain of 3 dB advantage in processing gain over operating at 9,600 bps that can be allocated toward anti-jam and covertness performance.

If the same information (4800 bits) is transmitted on two channels and the receiver summed the correlation scores prior to making a decision, then an additional 3 dB (6 dB total processing gain) performance improvement can be achieved. If all eight channels are used, an additional 9 dB gain (12 dB total processing gain) over the 9,600 bps mode can be achieved. The base stations coordinating the transmission and reception opportunities may reduce the implementation complexity at the base station and at the terminal.

Figure 7:
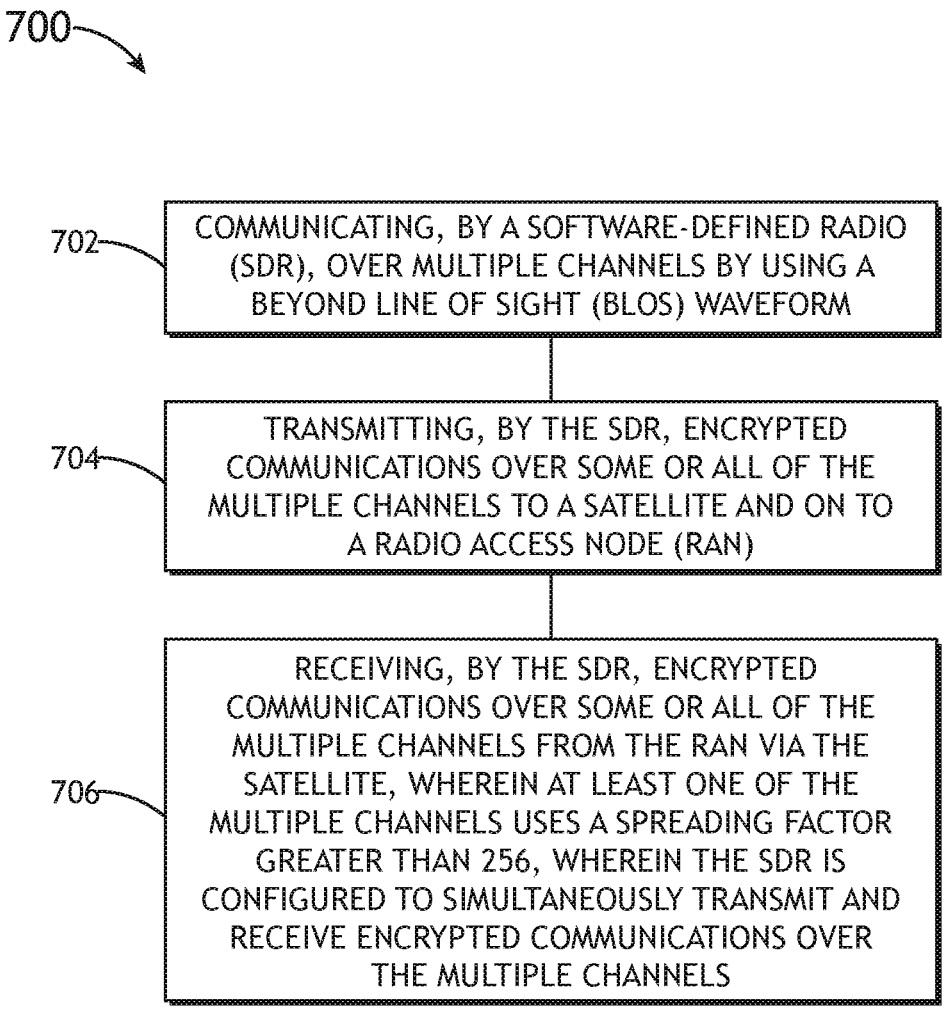
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include communicating, by a software-defined radio (SDR), over multiple channels by using a beyond line of sight (BLOS) waveform.

A step 704 may include transmitting, by the SDR, encrypted communications over some or all of the multiple channels to a satellite and on to at least one radio access node (RAN).

A step 706 may include receiving, by the SDR, encrypted communications over some or all of the multiple channels from the at least one RAN via the satellite, wherein at least one of the multiple channels uses a spreading factor greater than 256, wherein the SDR is configured to simultaneously transmit and receive encrypted communications over the multiple channels.

Further, the method 700 may include any of the operations disclosed throughout.

As will be appreciated from the above, embodiments of the inventive concepts disclosed herein may be directed to a method and a system including a software-defined radio (SDR) configured to communicate over at least one channel by using a BLOS waveform.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a software-defined radio (SDR) configured to communicate over multiple channels by using a beyond line of sight (BLOS) waveform, wherein the SDR is configured to transmit encrypted communications over some or all of the multiple channels to a satellite and on to at least one radio access node (RAN), wherein the SDR is configured to receive encrypted communications over some or all of the multiple channels from the at least one RAN via the satellite, wherein at least one of the multiple channels uses a spreading factor greater than 256, and wherein the SDR is configured to simultaneously transmit and receive encrypted communications over the multiple channels, wherein the SDR comprises a modem, a first common receiver-exciter (CRE), a second CRE, a front end, an internal power amplifier, and an auxiliary receiver, wherein some or all of the modem, the first CRE, the second CRE, the front end, the internal power amplifier, and the auxiliary receiver are communicatively coupled, wherein the modem comprises at least one processor configured to process, in parallel, the received encrypted communications and to-be-transmitted encrypted communications that become the transmitted encrypted communications, and wherein the SDR further comprises a cryptographic subsystem (CSS) configured to decode the received encrypted communications and to use particular spreading factors for the transmitted encrypted communications.

2. The system of claim 1, wherein the SDR supports multiple users in a 5 megahertz (MHz) channel, wherein the multiple users are allocated spreading codes with spreading factors greater than 256 to communicate with a single RAN.

3. The system of claim 1, wherein the SDR supports a user allocated multiple 5 megahertz (MHz) channels to communicate with multiple RANs using spreading factors greater than 256.

4. The system of claim 1, wherein the BLOS waveform is a slotted code-division multiple access (CDMA) direct sequence spread spectrum waveform, wherein the BLOS waveform is a military waveform.

5. The system of claim 1, wherein at least some of the multiple channels are aggregated to transmit a wider-band signal than one of the multiple channels, wherein the wider-band signal spreads data over the at least some of the multiple channels to at least one of increase robustness or improve a low probability of detection (LPD).

6. The system of claim 1, wherein the multiple channels includes eight channels, wherein the SDR is configured to simultaneously transmit and receive the encrypted communications in parallel over the eight channels.

7. The system of claim 1, wherein the SDR is configured to, at a given time, enable one of: an increased data rate by transmitting different data on each of the multiple channels, an increased robustness by transmitting same data on each of the multiple channels, or a hybrid increased robustness and increased data rate by transmitting same data on at least two of the multiple channels and transmitting different data on at least two other of the multiple channels.

8. The system of claim 1, wherein the SDR is configured to, at a given time, enable one of: an increased robustness, a lower probability of detection (LPD), or a hybrid increased robustness and LPD, wherein the hybrid increased robustness and LPD has a lower robustness than the increased robustness and a higher probability of detection than the LPD.

9. The system of claim 1, wherein all of the multiple channels uses a spreading factor greater than 256.

10. The system of claim 1, wherein the at least one of the multiple channels uses a spreading factor between 512 and 2,560.

11. The system of claim 1, further comprising a vehicle comprising the SDR.

12. The system of claim 1, wherein the at least one RAN is multiple RANs, wherein the multiple RANs coordinate with each other such that the multiple RANs allocate transmission and reception opportunities simultaneously so that there is operability for a N-channel transmit or N-channel receive operation, wherein N is an integer greater than or equal to two.

13. A method, comprising:
    communicating, by a software-defined radio (SDR), over multiple channels by using a beyond line of sight (BLOS) waveform;
    transmitting, by the SDR, encrypted communications over some or all of the multiple channels to a satellite and on to at least one radio access node (RAN); and
    receiving, by the SDR, encrypted communications over some or all of the multiple channels from the at least one RAN via the satellite,
    wherein at least one of the multiple channels uses a spreading factor greater than 256, wherein the SDR is configured to simultaneously transmit and receive encrypted communications over the multiple channels,
    wherein the SDR comprises a modem, a first common receiver-exciter (CRE), a second CRE, a front end, an internal power amplifier, and an auxiliary receiver, wherein some or all of the modem, the first CRE, the second CRE, the front end, the internal power amplifier, and the auxiliary receiver are communicatively coupled, wherein the modem comprises at least one processor configured to process, in parallel, the received encrypted communications and to-be-transmitted encrypted communications that become the transmitted encrypted communications, and
    wherein the SDR further comprises a cryptographic subsystem (CSS) configured to decode the received encrypted communications and to use particular spreading factors for the transmitted encrypted communications.

* * * * *